(12) United States Patent
Miyajima (10) Patent No.: US 6,478,562 B1
(45) Date of Patent: Nov. 12, 2002

(54) RESIN MOLDING MACHINE

(75) Inventor: Fumio Miyajima, Nagano (JP)

(73) Assignee: Apic Yamada Corp., Nagano (JP)

( * ) Notice: Subject to any disclaimer, the term of this patent is extended or adjusted under 35 U.S.C. 154(b) by 29 days.

(21) Appl. No.: 09/661,576

(22) Filed: Sep. 14, 2000

(30) Foreign Application Priority Data

Sep. 14, 1999 (JP) ............................................ 11-260473

(51) Int. Cl.[7] .......................... B29C 70/72; B29C 45/02
(52) U.S. Cl. .................... 425/89; 264/272.17; 425/116; 425/215; 425/544
(58) Field of Search .......................... 425/89, 116, 544, 425/215; 264/272.17

(56) References Cited

U.S. PATENT DOCUMENTS

| | | | | |
|---|---|---|---|---|
| 5,326,243 A | * | 7/1994 | Fierkens | 264/272.17 |
| 6,048,483 A | * | 4/2000 | Miyajima | 264/272.14 |
| 6,080,354 A | * | 6/2000 | Miyajima | 264/272.17 |
| 6,306,331 B1 | * | 10/2001 | Lajza et al. | 264/271.1 |
| 6,344,162 B1 | * | 2/2002 | Miyajima | 264/272.14 |

FOREIGN PATENT DOCUMENTS

| | | |
|---|---|---|
| JP | A-5-41407 | 2/1993 |
| JP | 5-111931 A | 5/1993 |
| JP | 7-112453 A | 5/1995 |
| JP | A8-288293 | 11/1996 |
| JP | A-9-64049 | 3/1997 |
| JP | A-9-64078 | 3/1997 |
| JP | A-9-219421 | 8/1997 |
| JP | A-10-79362 | 3/1998 |
| JP | 10-92856 A | * 4/1998 |
| JP | 10-305438 A | 11/1998 |

* cited by examiner

*Primary Examiner*—Robert Davis
(74) *Attorney, Agent, or Firm*—Birch, Stewart, Kolasch & Birch, LLP (57) ABSTRACT

The method of resin molding and a resin molding machine are capable of uniformly control amount of the resin for molding a work piece and pressure of the melted resin. A parting face of one of molding dies, which includes a pot and a cavity, is covered with release film. A work piece to be molded is set in the cavity. Resin is set in the pot. Parts of the release film, which enclose the work piece except a resin path, are clamped by the molding dies. Capacity of the cavity is reduced when the parts of the release film are clamped. The resin is sent from the pot to the cavity so as to mold the work piece in the cavity.

3 Claims, 8 Drawing Sheets

RESIN MOLDING MACHINE

BACKGROUND OF THE INVENTION

The present invention relates to a method of resin molding and a resin molding machine, more precisely relates to a method of resin molding and a resin molding machine, in each of which a parting face of a molding die, which includes a pot and a cavity, is covered with release film when a work piece is molded with resin.

Conventionally, in the case of forming a plurality of semiconductor devices, which includes cable layers and electric terminals, e.g., metallic pillars, on a semiconductor wafer, compression molding has been employed so as to fill spaces between the metallic pillars with resin.

The conventional compression molding was disclosed in the Japanese Patent Gazette No. 10-79362. In the conventional method, a semiconductor wafer, which is a work piece to be-molded, is set in a cavity, a resin tablet is mounted on a surface of the wafer, in which the metallic pillars are formed, and the resin tablet is compressed so as to fill the spaces between the metallic pillars with the resin. By filling the spaces, the surface of the wafer can be molded.

However, in the case of molding the semiconductor devices formed on the surface of the semiconductor wafer, the resin is compressed so as to make a thickness of the molding resin layer 0.1 mm or less, so it is difficult to uniformly mold the whole surface of the wafer with the resin. Many of the metallic pillars are extended from the surface with separations of 0.1 mm or less, a diameter of the wafer is 200–300 mm, the melted resin cannot flow smoothly, resin pressure varies and the melted resin is apt to solidify on the way to the cavity, so it is quite difficult to uniformly mold the wafer.

Namely, it is difficult for the conventional compression molding method to uniformly control amount of the resin for molding the work piece and pressure of the melted resin. Even if the resin is overflowed from the cavity, it is still difficult for the compression molding to maintain the resin pressure.

SUMMARY OF THE INVENTION

An object of the present invention is to provide a method of resin molding and a resin molding machine, which are capable of uniformly control amount of the resin for molding a work piece and pressure of the melted resin.

To achieve the object, the present invention has following structures.

The method of resin molding of the present invention comprises the steps of:

covering a parting face of one of molding dies, which includes a pot and a cavity, with release film;

setting a work piece to be molded in the cavity;

setting resin in the pot;

clamping parts of the release film, which enclose the work piece except a resin path, by the molding dies;

reducing capacity of the cavity when the parts of the release film are clamped; and sending the resin from the pot to the cavity so as to mold the work piece in the cavity.

On the other hand, the resin molding machine of the present invention includes molding dies having parting faces, which are covered with release film when a work piece is molded, and one of the molding dies comprises:

a cavity being formed in the parting face;

a movable clamping section for clamping parts of the release film, which enclose the work piece except a resin path;

a resin sending mechanism including a pot, which is formed in the parting face and communicated to the cavity, and a plunger, which is movably provided in the pot and sends resin from the pot to the cavity when the movable clamping section clamps the release film; and a movable cavity block constituting a part of the cavity, the movable cavity block being moved in the cavity so as to reduce capacity of the cavity.

In the resin molding machine, the overflowed resin, which is overflowed from the cavity when the movable cavity block is moved to reduce the capacity of the cavity, may be returned to the pot so as to push the plunger backward.

In the resin molding machine, an overflow cavity may be formed in the movable clamping section, wherein a part of the overflowed resin is returned to the pot and the rest of the overflowed resin is introduced into the overflow cavity.

The resin molding machine may further comprise heaters, which are provided in the movable cavity block and the other molding die, wherein the heaters heat at lower temperature when the resin is filled in the cavity to mold the work piece, the heaters heat at higher temperature when the movable cavity block is moved to reduce the capacity of the cavity.

In the method and the machine of the present invention, the capacity of the cavity is reduced when the parts of the release film are clamped. By reducing the capacity of the cavity, the melted resin is overflowed from the cavity, so that the resin pressure in the cavity can be close to the resin pressure in the pot and the work pieces can be uniformly molded with a prescribed thickness.

Especially, in the case of molding a surface of a wafer in which metallic pillars are formed, the surface can be uniformly molded. And, front end faces of the metallic pillars are securely covered with the release film, so that the front end faces can be exposed, as electric terminals, after molding. In the case of molding a semiconductor wafer on which a plurality of IC chips are matrically formed, quality of semiconductor devices can be improved.

If the heaters heat at lower temperature when the resin is filled in the cavity to mold the work piece and the heaters heat at higher temperature when the movable cavity block is moved to reduce the capacity of the cavity, the melted resin can be prevented to solidify in a narrow path to the cavity, so that the work piece can be uniformly molded.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Note that, in the present embodiment, work pieces are semiconductor wafers, on which semiconductor devices including cable layers and metallic pillars are formed.

Figure 1:
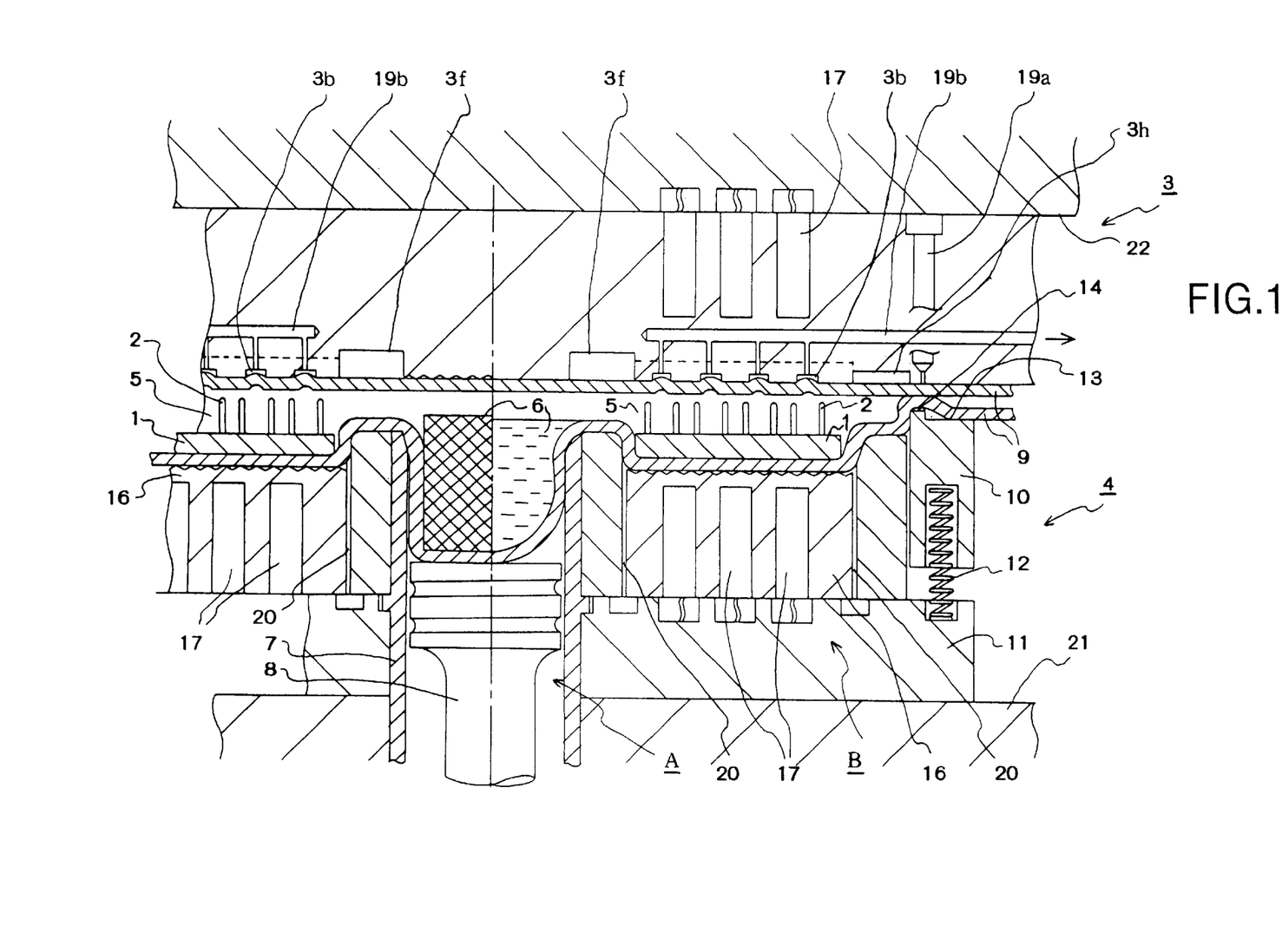
FIG. 1 is a partial sectional view of a resin molding machine of an embodiment of the present invention.

In FIG. 1, many metallic pillars 2 are vertically extended from an upper face of each semiconductor wafer 1, whose diameter is 200–300 mm. Cable layers (not shown) are also formed on the wafers 1. The resin molding machine of the present embodiment has an upper die 3 and a lower die 4. The wafers 1 are respectively set in cavities 5, which are formed in a parting face of the lower die 4, and will be clamped by the dies 3 and 4. A resin sending section "A", which includes a pot 7, in which resin 6 is set, and a plunger 8, which exerts and sends the melted resin 6 to the cavities 5 via resin paths, is formed in the lower die 4. The plunger 8 is vertically moved in the pot by a transfer mechanism (not shown). The resin 6 may be a solid resin tablet, resin pellets and liquid resin.

Two sheets of release film 9 respectively cover over parting faces of the dies 3 and 4 so as to prevent the resin 6 from directly contacting the cavities 5, the pot 7, etc. The release film 9 has enough heat-resistance property to temperature of the heated dies 3 and 4. The release film 9 can be easily peeled off from the parting faces of the dies 3 and 4. Further, the release film 9 can be easily deformed and extended along inner faces of the cavities 5. Therefore, the release film 9 is made of a proper material, e.g., PTFE, ETFE, PET, FEP, glass cloth including fluorine, polypropylene, polyvinylidence chloride, etc. The release film 9 is formed like a long belt and continuously fed to the dies 3 and 4 by a film feeding mechanism (not shown). Note that, the release film 9 may be previously cut to have a required length.

The lower die 4 has movable clamping sections 10, which are capable of clamping parts of the release film 9, which enclose the wafers 1 except resin paths, so as to tightly wrap the wafers with the release film 9. The movable clamping sections 10 are respectively biased upward by springs 12, which are provided on a lower base 11. Namely, the movable clamping sections 10 are floated from the lower base 11. Air vent grooves 14, which introduce air from the cavities 5 to outside, are formed in upper ends of the movable clamping sections 10.

Figure 3:
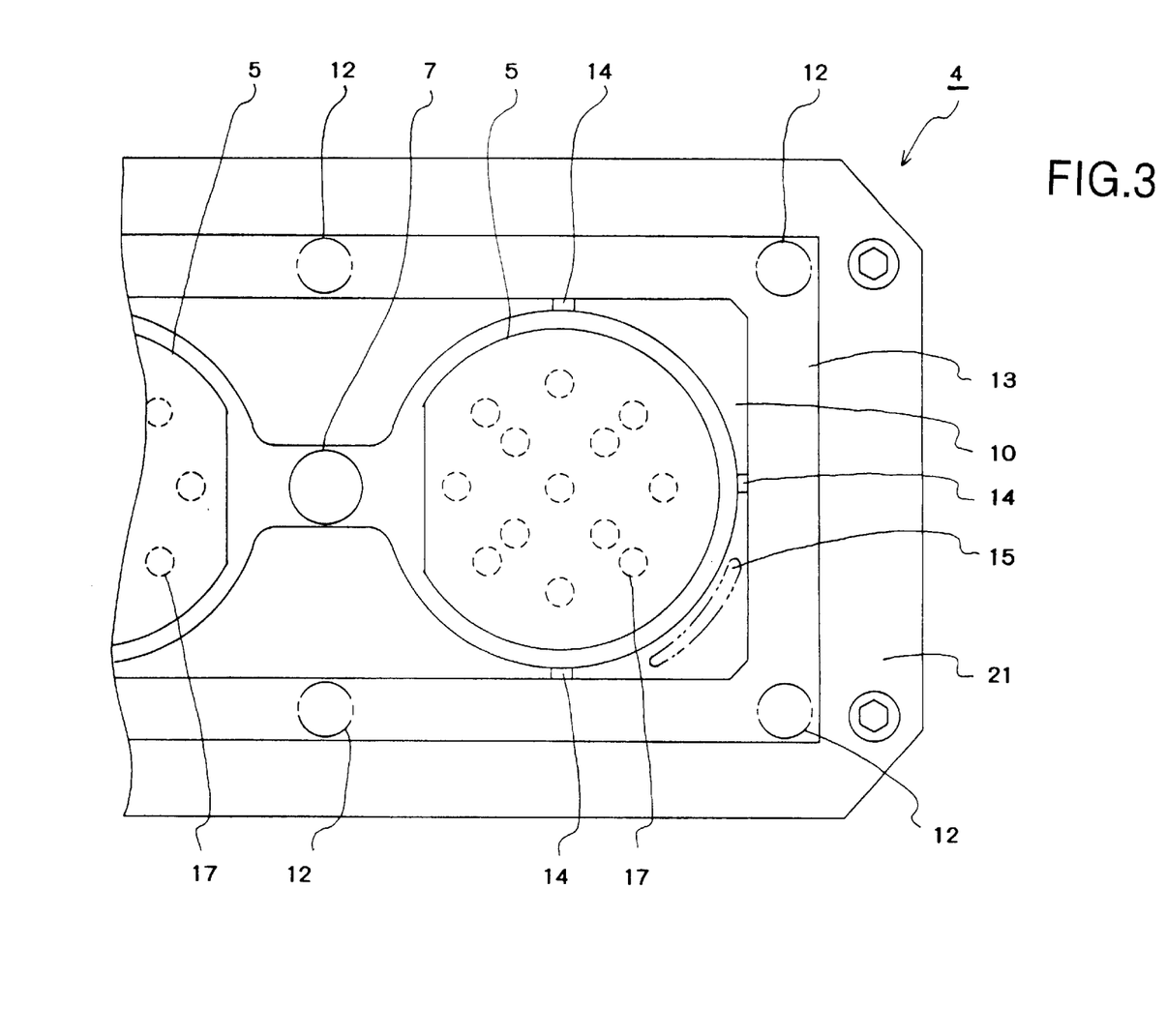
FIG. 3 is a plan view of a lower die.

Movable cavity sections "B" are fixed on the lower base 11. Each movable cavity section "B" includes a movable cavity block 16, which constitutes a bottom part of the cavity 5. The movable cavity block 16 is relatively moved, with respect to the movable clamping section 10, when the dies 3 and 4 are closed to clamp the wafers 1 and the release film 9. With this structure, when the movable clamping sections 10 clamp the parts of the release film 9, the movable cavity blocks 16 are moved in the cavities 5 so as to reduce capacity of the cavities 5. If the cavities 5 are filled with the melted resin 6, the melted resin 6 is overflowed from the cavities 5 by reducing the capacity of the cavities 5. The overflowed resin 6 is returned to the pot 7 and pushes the plunger 8 backward, so that resin layers of the molded wafers 1 can have prescribed thickness. Note that, the overflowed resin 6 may be introduced into overflow cavities 15 (see FIG. 3).

Heaters 17 are provided in the upper die 3 and the movable cavity blocks 16. The heaters 17 heat the die 3 and the movable cavity blocks 16 at a lower temperature, e.g., 100–160° C., when the resin 6 is filled in the cavities 5 to mold the wafers 1; the heaters 17 heat the same at higher temperature, e.g., 180° C., when the movable cavity blocks 16 are relatively moved to reduce the capacity of the cavities 5. With this heating action, the melted resin is not solidified in resin paths, the widths of which are about 1.0 mm, so that the resin 6 can be uniformly filled in the cavities 5.

Preferably upper faces of the movable cavity blocks 16 and a bottom face of the upper die 3 have rough surfaces so as to securely fix the release film 9. The rough surfaces may be formed by, for example, electrospark machining.

Figure 2:
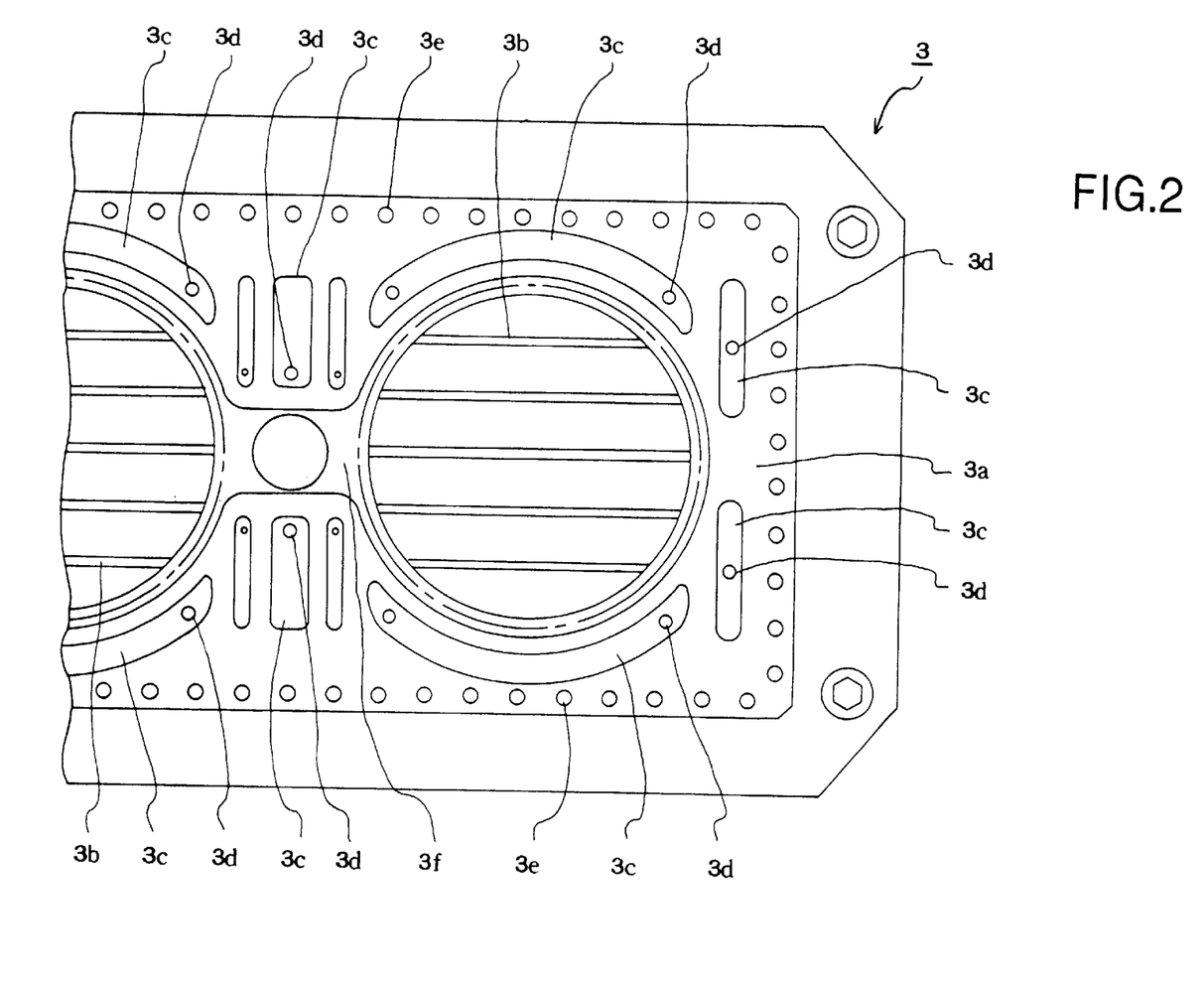
FIG. 2 is a bottom view of an upper die.

In FIG. 2, a clamping face 3a is formed on the lower parting face of the upper die 3. A plurality of sucking grooves 3b, which correspond to the movable cavity blocks 16, are formed in the clamping face 3a so as to draw extended parts of the release film 3, which locate over the wafers 1.

Grooves 3c are formed in the vicinity of the sucking grooves 3b and a part corresponding to the pot 7, and air sucking holes 3d are opened in the grooves 3c. The air sucking holes 3d are communicated to an air sucking mechanism (not shown). The release film 9 is fed on the parting face of the upper die 3 with slight slack, but the slack can be drawn into the grooves 3c by air suction through the air sucking holes 3d. With this action, creases of the release film 9 can be extended with proper tension. Air sucking holes 3c for drawing and fixing the release film 9 are formed along four sides of the clamping face 3a of the upper die 3. A back-flow cavity 3f is formed in the parting face of the upper die 3. The back-flow cavity 3f encloses a cull section, which corresponds to the pot 7 of the lower die 4. When the wafers 1 are molded with the melted resin, the release film 9 on the parting face of the upper die 3 is moved into the back-flow 3f by the overflowed resin which flows from the cavities 5 to the pot 7, so that a space for passing the resin can be formed. Further, as shown in FIG. 1, overflow cavities 3h are formed in the parting face of the upper die 3. The overflow cavities 3h respectively correspond to outer edges of the cavities 5 of the lower die 4. The resin overflowed from the cavities 5 can be introduced into the overflow cavities 3h.

In FIG. 1, air paths 19a, which are communicated to the air sucking holes 3d and 3e, and air paths 19b, which communicated to the air sucking grooves 3b, are formed in the upper die 3 so as to draw and fix the release film 9 on the clamping face 3a. On the other hand, in the lower die 4, air sucking paths 20 are formed round the movable cavity blocks 16 of the cavities 5.

The lower base 11 of the lower die 4 is fixed on a movable base 21, and the movable cavity blocks 16 are fixed on the lower base 11. The movable clamping sections 10 are floated and supported by the springs 12. The upper die 3 is fixed to a fixed base 22. The movable base 21 is vertically moved by a driving mechanism (not shown). When the dies 3 and 4 are closed, the movable base 21 is upwardly moved until the movable clamping sections 10 contact the upper die 3 so as to clamp the parts of the release film 9, which enclose the wafers 1 except the resin paths, between the movable clamping sections 10 and the upper die 3. Upon clamping the release film 9, the movable base 21 is stopped. After the cavities 5 are filled with the resin 6, the movable base 21 is further moved upward so as to reduce the capacity of the cavities 5. At that time, the movable clamping sections 10 have already contacted the upper die 3, so the springs 12 are compressed.

In FIG. 1, when the parting faces of the dies 3 and 4 are covered with the release film 9, the air sucking paths 20, which are formed around the cavities 5, suck the air so as to draw and fix the release film 9 onto inner faces of the cavities 5 and the parting faces.

Figure 4:
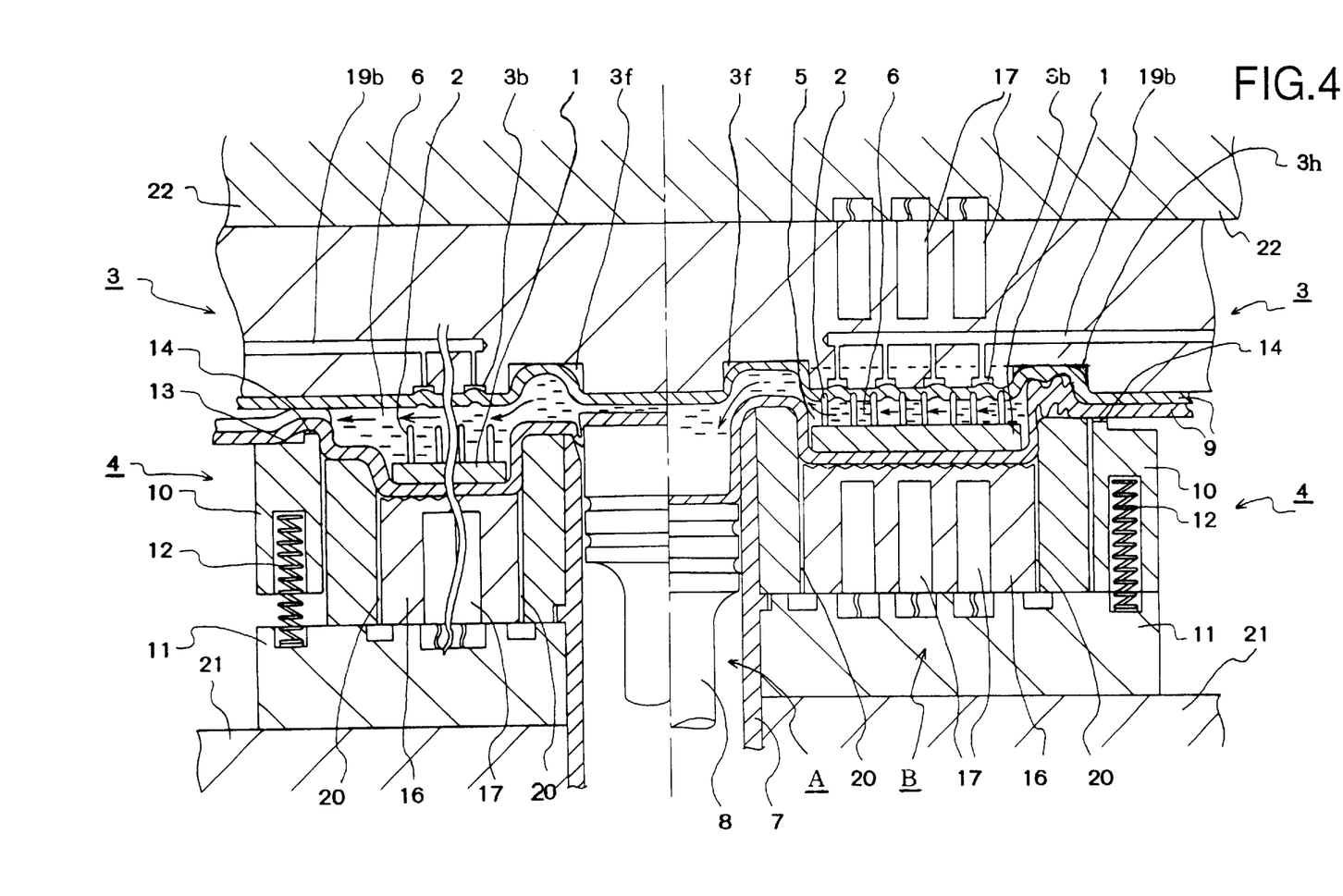
FIG. 4 is a partial sectional view of the resin molding machine, which shows resin molding action.

In FIG. 4, a state of fixing the release film 9 on the parting faces of the dies 3 and 4 is shown on the left side of a center line. In this state, the wafers I are set in the cavities 5 and the resin 6 is set in the pot 7. Then, the movable base 21 is upwardly moved prescribed length by the driving mechanism (not shown) so as to clamp the wafers 1 with the release film 9 by the movable clamping sections 10 and the upper die 3. At that time, the resin paths, whose width is about 1.0 mm, are formed between the wafers 1 and the upper die 3. With the resin paths, the resin 6, which has been melted in the pot 7, is exerted and sent from the pot 7 to the cavities 5 via the resin paths by driving the plunger 8. The resin 6 is filled in the cavities 5 and the overflow cavities 3h, which are respectively communicated to the cavities 5. On the other hand, air in the cavities 5 are discharged outside via the air vent grooves 14 of the movable clamping sections 10.

In the state of clamping the wafers 1 and the release film 9 by the movable clamping sections 10 and the upper die 3, the movable base 21 is further moved upward so as to relatively move the movable cavity blocks 16 and reduce the capacity of the cavities 5. With this action, two sheets of the release film 9 are mutually fitted in the overflow cavities 3h, and the melted resin 6 in the cavities 5 flow toward the pot 7 (see the right side of FIG. 4). The melted resin 6 returned to the pot 7 pushes the plunger 8 downward, so that the resin pressure in the cavities 5 are almost equal to that in the pot 7 and resin layers, which have prescribed thickness, e.g., 0.1 mm, can be formed on the wafers 1. Namely, the resin layers can be uniformly formed on the wafers 1, on which the metallic pillars 2 are formed, with prescribed amount of the resin 6

Figure 5:
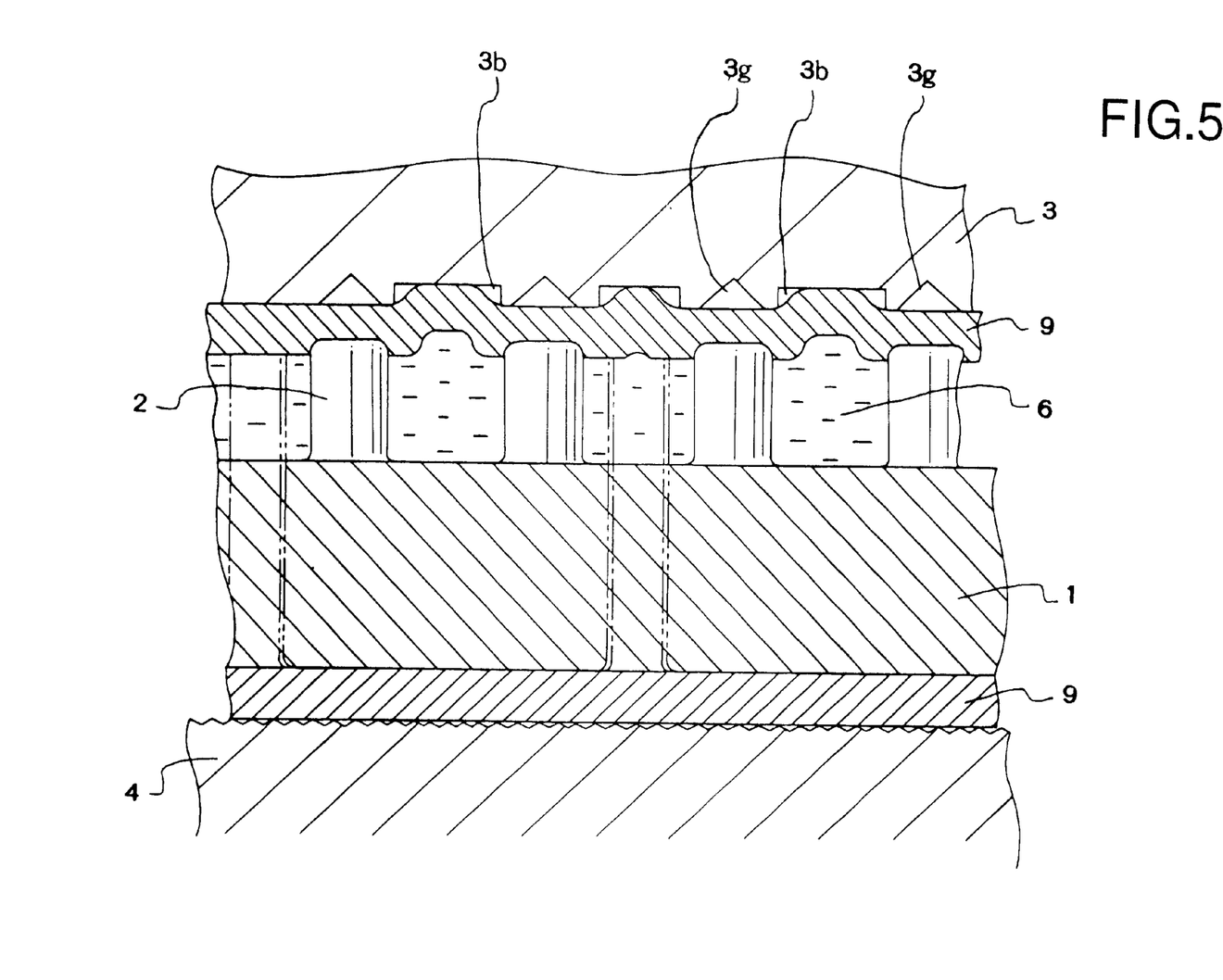
FIG. 5 is a partial sectional view of the resin molding machine, which shows a molded product.

Another embodiment will be explained with reference to FIG. 5. In FIG. 5, escaping cavities 3g are formed in the clamping face 3a of the upper die 3. The escaping cavities 3g are located to face the upper end faces of the metallic pillars 2 of the wafers 1. With this structure, shock of clamping the metallic pillars 2 can be absorbed, so that the metallic pillar 2 can be protected. The sucking grooves 3b in the clamping face 3a of the upper die 3 are located to correspond to spaces between the metallic pillars 2. The extended parts of the release film 9 can be drawn. The resin 6 filled in the cavities 5 pushes the release film 9 into the grooves 3b as shown in FIG. 5.

Figure 6A:
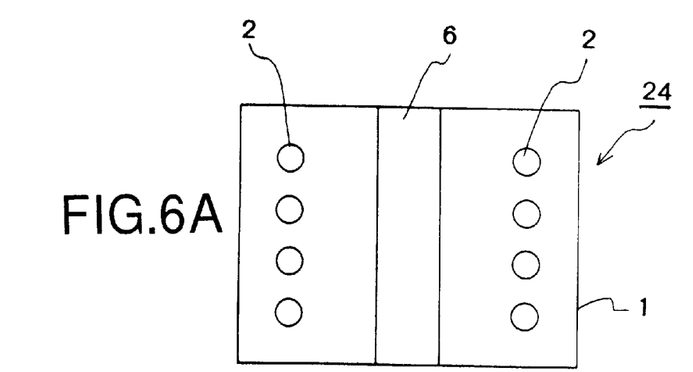
FIGS. 6A–6E are explanation views of a semiconductor device.
Figure 6B:
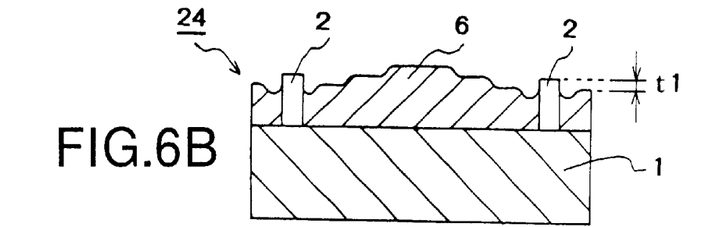
Figure 6C:
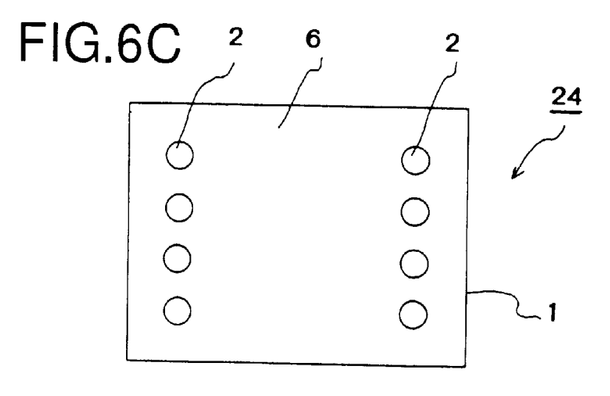
Figure 6D:
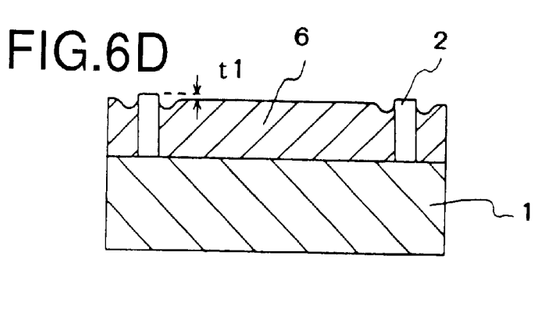

A semiconductor device, which is cut from the molded wafer 1, is shown in FIGS. 6A–6D. FIGS. 6A and 6B are plan views; FIGS. 6C and 6D are sectional views. When the wafers 1 are molded with the resin 6, the upper ends of the metallic pillars 2 of the semiconductor device 24 are securely covered with the release film 9, so that the upper ends of the pillars 2 can be securely exposed. As shown in FIG. 6C, solder balls 25 can be connected to the upper ends of the metallic pillars 2. Namely, electric terminals can be securely formed. Note that, the semiconductor device 24 shown in FIGS. 6C and 6D is molded by the molding dies, which have no sucking grooves 3b in the clamping face 3a of the upper die 3 (see FIG. 2).

Figure 6E:
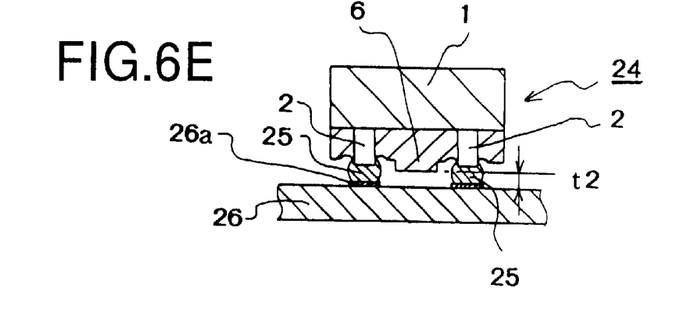

In the semiconductor device 24 shown in FIGS. 6A and 6B, the layer of the resin 6 is heaped between the metallic pillars 2. In this example, the resin layer 6 can be made thicker. The upper end of the metallic pillars 2 must be exposed proper length t1 from the resin layer 6. When the solder balls 25, which have been connected to the metallic pillars 2, are electrically connected to pads 26a of a circuit board 26 (see FIG. 6E), thermal stress can be relieved by the thicker resin layer 6. Note that, a proper distance t2 between the solder balls 25 and the circuit board 26 should be maintained.

In the embodiments, the wafers 1 and the release film 9 are clamped by the movable clamping sections 10; the cavities 5 are filled with the resin 6, which is exerted and sent from the resin sending section "A", so as to mold the wafers 1; and the movable cavity blocks 16 reduce the capacity of the cavities 5 so as to overflow the resin 6 therefrom. By overflowing the resin 6 from the cavities 5, the resin pressure in the cavities 5 can be almost equal to that in the pot 7 and the wafers 1 can be uniformly molded with prescribed amount of the resin 6. And the molded wafers 1 can have the resin layers 6, whose thickness are almost equal.

In the present embodiments, the wafers 1 are molded as the work pieces. But the work piece is not limited to the semiconductor wafer, other things, e.g., a circuit board on which IC chips are mounted, may be molded by the resin molding machines of the present embodiments.

Another embodiment, in which a circuit board is molded, will be explained with reference to FIGS. 7–9D. Note that, elements explained in the embodiments shown in FIGS. 1–6 are assigned the same symbols and explanation will be omitted.

Figure 7:
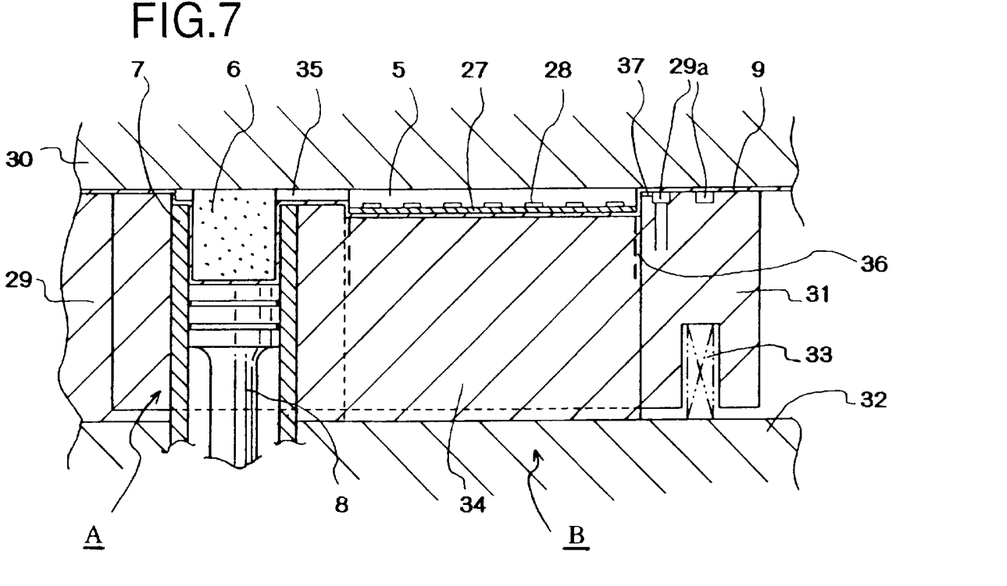
FIG. 7 is a partial sectional view of a resin molding machine of another embodiment.

In FIG. 7, a circuit board 27, which is an example of the work piece, is set in the cavity 5. A plurality of IC chips 28 are matrically arranged on an upper face of the circuit board 27. A parting face of a lower die 29, which includes the pot 7 and the cavity 5, is covered with the release film 9. A movable clamping section 31 encloses the cavity 5 of the lower die 29, and the movable clamping section 31 clamps the release film 9 with an upper die 30 so as to tightly wrap the circuit board 27. The lower die 29 includes: the resin sending section "A" including the pot 7 and the plunger 8; and a movable cavity section "B" including a movable cavity block 34, which is fixed on a lower base 32 and constitutes a bottom part of the cavity 5. The movable cavity block 34 can be relatively moved, in the vertical direction, with respect to the movable clamping section 31. The movable cavity block 34 is fixed on the lower base 32, which is fixed on a movable base (not shown). Springs 33 support and float the movable clamping section 31 over the lower base 32.

A runner path 35, which is communicated to the pot 7 and the cavity 5, is formed in an upper face of the movable cavity block 34. After the movable clamping section 31 contacts the upper die 30, the lower die 20 is further moved upward. With this action, the movable cavity block 34 is relatively moved upward in the cavity 5, so that the capacity of the cavity 5 is reduced. By reducing the capacity of the cavity 5, the melted resin 6 in the cavity 5 overflows from the cavity 5 and returns into the pot 7. The returned resin 6 pushes the plunger backward, so that thickness of the resin layers of the molded products can be almost equal. An air sucking hole 36 is formed between the movable cavity block 34 and the movable clamping section 31. The release film 9 can be tightly fixed on the inner faces of the cavity 5 by sucking the air through the air sucking hole 36.

Figure 8:
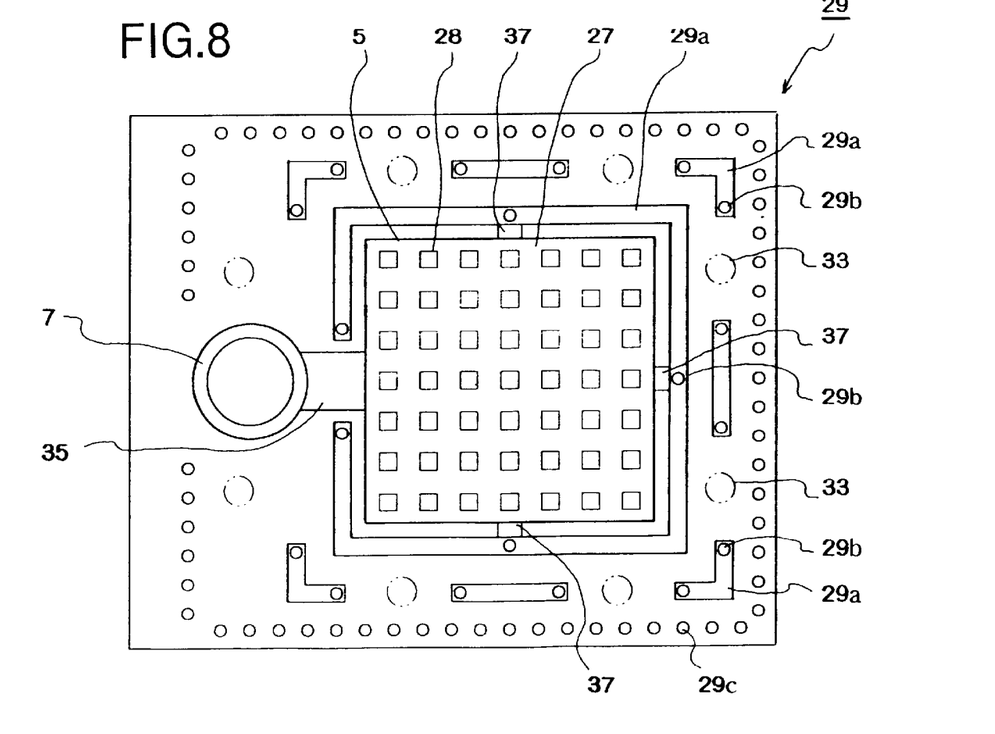
FIG. 8 is a plan view of a lower die.

In FIG. 8, air vent grooves 37, which introduce the air in the cavity 5 to the outside, is formed in the upper face of the movable clamping section 31. Grooves 29a are formed on the upper faces of the movable clamping section 31 and the movable cavity block 34. The grooves 29a are arranged to enclose the cavity 5. Air sucking holes 29b are formed in the grooves 29a. The release film 9 has been fed on the lower die 29 with slack. But the slackened parts of the release film 9 are drawn into the grooves 29a by sucking the air through the air sucking holes 29b. By drawing the release film 9, creases of the release film 9 can be extended with proper tension. Further, air sucking holes 29c are formed along edges of the lower die 29 so as to draw and fix the release film 9.

The lower base 32 is vertically moved by a driving mechanism (not shown). When the dies 29 and 30 are closed, the movable base 32 is upwardly moved until the movable clamping section 31 contacts the upper die 30 so as to clamp the parts of the release film 9, which enclose the cavity 5 except the resin path, between the movable clamping sections 31 and the upper die 30. Upon clamping the release film 9, the movable base 32 is stopped. After the cavity 5 is filled with the resin 6, the movable base 32 is further moved upward so as to reduce the capacity of the cavity 5. At that time, the movable clamping sections 31 have already contacted the upper die 30, so the springs 33 are compressed. The heaters (not shown) are provided in the upper die 30 and the movable cavity blocks 34 as well as the embodiment shown in FIGS. 1–4. The heaters heat the die 30 and the movable cavity block 34 at lower temperature, e.g., 100–160° C., when the resin 6 is filled in the cavity 5 to mold the circuit board 27; the heaters heat the same at higher temperature, e.g., 180° C., when the movable cavity block 34 is relatively moved to reduce the capacity of the cavity 5.

Successively, action of the resin molding machine shown in FIGS. 7 and 8 will be explained with reference to FIGS. 9A–9D.

Figure 9A:
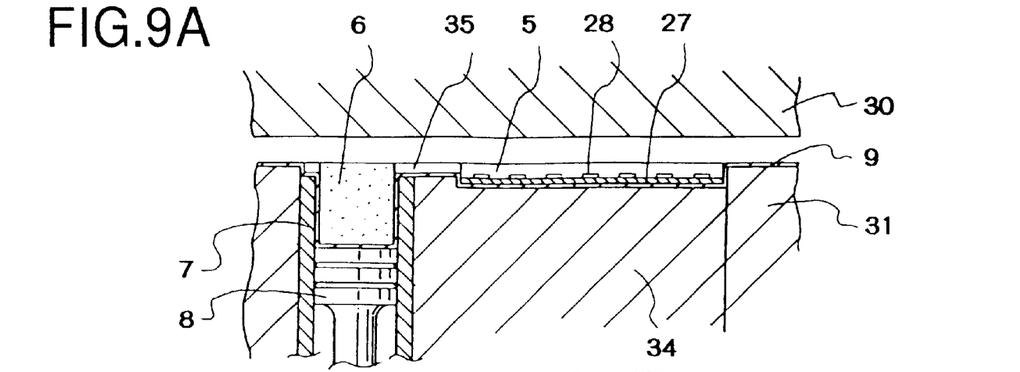
FIGS. 9A–9D are partial sectional views of the resin molding machine, which show resin molding action.

In FIG. 9A, the dies 20 and 30 are opened, and the parting face of the lower die 29 is covered with the release film 9. The resin tablet 6 is set in the pot 7, and the circuit board 27 is set in the cavity 5.

Figure 9B:
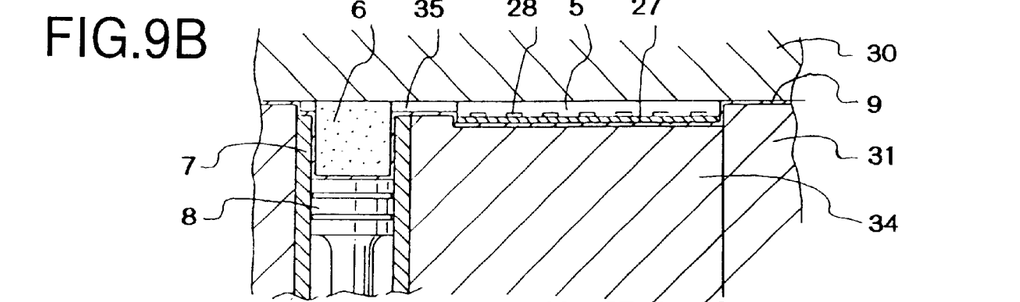

In FIG. 9B, the lower base 32 is moved upward by the driving mechanism (not shown) to close the dies 29 and 30. The parts of the release film 9, which enclose the cavity 5 except the resin path, is clamped between the movable clamping section 31 and the upper die 30. At that time, the pot 7 and the cavity 5 are communicated by the resin path 35.

Figure 9C:
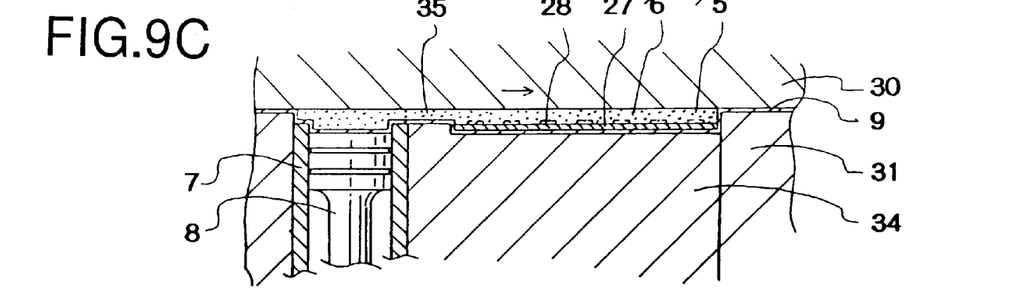

In FIG. 9C, the plunger 8 is actuated to move upward, so that the melted resin 6 is exerted and sent from the pot 7 to the cavity 5. By filling the cavity 5 with the resin 6, air in the cavity 5 is introduced outside via the air vent grooves 37 of the movable clamping section 31.

Figure 9D:
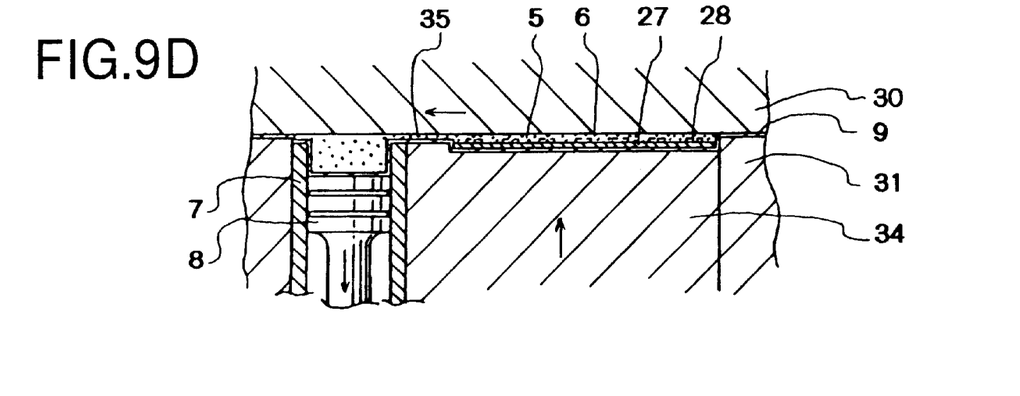

In FIG. 9D, the dies 29 and 30 are closed. In this state, the movable base 32 is further moved upward so as to move the movable cavity block 34 upward. With this action, the movable cavity block 34 reduces the capacity of the cavity 5, so that the resin 6 in the cavity 5 overflows and returns to the pot 7. The returning resin 6 pushes the plunger 8 backward (downward). By moving the plunger 8 backward, the resin pressure in the cavity 5 is almost equal to that in the pot 7, and a resin layer, which has prescribed thickness, e.g., about 1.0 mm, and which molds the IC chips 28, can be formed on the circuit board 27. Namely, the resin layer can be uniformly formed on the circuit board 27 with prescribed amount of the resin 6, and quality of molding can be improved.

In the present embodiments, the semiconductor wafers 1 and the circuit board 27 are molded as the work pieces, but many kinds of work pieces can be molded. For example, a plastic board, a tape substrate, a board including a metallic heat sink, etc. can be molded as the work pieces.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A resin molding machine including molding dies having parting faces, which are covered with release film when a work piece is molded, one of said molding dies comprising:

a cavity being formed in the parting face;

a movable clamping section for clamping parts of the release film, which enclose the work piece except a resin path;

a resin sending mechanism including a pot, which is formed in the parting face and communicated to said cavity, and a plunger, which is movably provided in the pot and sends resin from said pot to said cavity when said movable clamping section clamps the release film; and a movable cavity block constituting a part of said cavity, said movable cavity block being moved in said cavity so as to reduce capacity of said cavity, wherein:

an excess of said resin is overflowed from said cavity when said movable cavity block is moved to reduce the capacity of said cavity, the excess of said resin being returned to said pot so as to push said plunger backward, and an overflow cavity is formed in said movable clamping section, and a part of the excess of said resin is returned to said pot and a remainder of the excess of said resin is introduced into said overflow cavity.

2. The resin molding machine according to claim 1, further comprising heaters, which are provided in said movable cavity block and the other molding die, said heaters heating at lower temperature when the resin is filled in said cavity to mold the work piece, said heaters heating at higher temperature when said movable cavity block is moved to reduce the capacity of said cavity.

3. The resin molding machine according to claim 1, wherein escaping cavities for absorbing a shock of clamping of the movable clamping sections are formed in the other molding die.

* * * * *